United States Patent [19]
Hakkenberg

[11] Patent Number: 4,489,623
[45] Date of Patent: Dec. 25, 1984

[54] AXLE SHAFT AND PUMP DRIVE MECHANISM

[75] Inventor: Peter Hakkenberg, Peoria, Ill.

[73] Assignee: Caterpillar Tractor Co., Peoria, Ill.

[21] Appl. No.: 373,825

[22] Filed: May 3, 1982

[51] Int. Cl.³ .............. F16H 3/14; F16D 21/04; F16D 31/02; B60K 17/28

[52] U.S. Cl. .............. 74/378; 74/404; 74/355; 74/799; 74/15.66; 192/20; 192/87.19; 60/423; 60/435; 414/694; 180/53.6

[58] Field of Search .............. 74/404, 404.5, 412, 74/355, 799, 15.4, 15.6, 15.63, 15.66, 15.69, 665 GB, 665 H, 378; 192/49, 51, 48.9, 20, 21, 87.14, 87.18, 87.19; 60/423, 435; 414/694; 180/53.1, 53.6, 243

[56] References Cited

U.S. PATENT DOCUMENTS

| | | | |
|---|---|---|---|
| 2,546,064 | 3/1951 | Gerst | 192/51 X |
| 2,687,652 | 8/1954 | Baker | 74/378 |
| 2,821,864 | 2/1958 | Baker | 74/378 |
| 3,254,735 | 6/1966 | Wilson | 180/53.1 |
| 3,266,590 | 8/1966 | Hungerford | 180/53.1 |
| 3,447,619 | 6/1969 | Nodwell et al. | 180/243 X |
| 3,463,020 | 8/1969 | Gelb | 192/51 X |
| 3,585,873 | 6/1971 | Austen | 74/378 X |
| 3,606,049 | 9/1971 | Gordon | 414/694 |
| 3,662,612 | 5/1972 | Lassanske | 74/355 |
| 3,874,470 | 4/1975 | Greene | 180/243 X |
| 3,960,284 | 6/1976 | Carpenter | 414/694 |
| 4,294,131 | 10/1981 | Murayama | 74/15.4 |
| 4,335,796 | 6/1982 | Smith | 74/15.66 X |

Primary Examiner—Allan D. Herrmann
Assistant Examiner—Stephen B. Andrews
Attorney, Agent, or Firm—Charles E. Lanchantin, Jr.

[57] ABSTRACT

An axle shaft and pump drive mechanism (12) for a vehicle (10) includes a continuously variable transmission unit (24), an axle shaft (20), a pump (22), and a coupling device (34,78) for connecting the transmission unit (24) to the axle shaft (20) or to the pump (22) and operating them individually through an infinitely variable speed ratio range. When the vehicle, such as a backhoe loader, is not being propelled, the continuously variable transmission unit (24) can be used to drive the implement pump (22) which can then be of the fixed displacement type for improved effectiveness.

3 Claims, 2 Drawing Figures

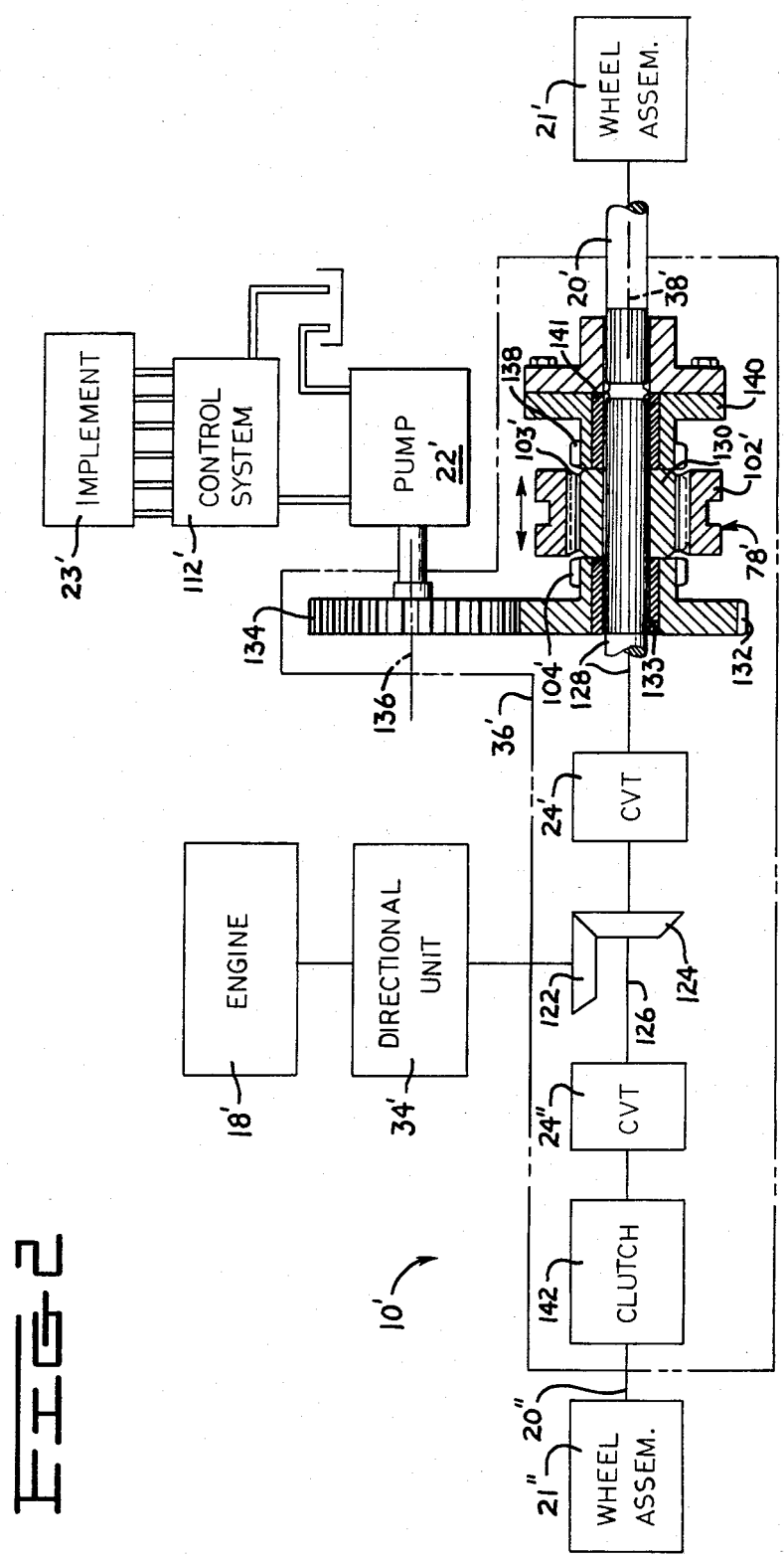

AXLE SHAFT AND PUMP DRIVE MECHANISM

DESCRIPTION

1. Technical Field

This invention relates generally to a vehicle axle shaft driven by a continuously variable transmission unit, and more particularly to using such a transmission unit for operating a pump.

2. Background Art

In many vehicles the transmission that transmits engine power to the drive wheels or tracks is not being used when the vehicle is stationary and various work implements are being operated. In an industrial backhoe loader vehicle, for example, the vehicle drive wheels are generally disposed off the ground because outriggers are utilized to stabilize the machine. During operation of the backhoe the transmission is neutralized and a relatively expensive variable displacement pump system is driven by the engine in order to power the backhoe through its full range of operation.

The present invention is directed to overcoming one or more of the problems as set forth above.

DISCLOSURE OF THE INVENTION

In one aspect of the present invention an axle shaft and pump drive mechanism for a vehicle includes an axle shaft, a pump, and a continuously variable transmission unit. Advantageously, coupling means are provided for selectively connecting the transmission unit drivingly to either the axle shaft for propelling the vehicle through an infinitely variable speed ratio range, or to the pump and operating the pump through an infinitely variable speed ratio range.

Thus, I contemplate using a continuously variable transmission unit to drive an implement pump when it is not necessary to powerably drive the ground engaging members of the vehicle. Preferably, the pump is of the fixed displacement type which normally is equivalent or better in performance, efficiency and energy consumption than the usual variable displacement pump. Less overall cost is involved and the system offers improved reliability and serviceability. Particularly, the less complex fixed displacement pump can be removably mounted on the rear axle housing in an easily accessible location.

In another aspect of the present invention an axle shaft and pump drive mechanism for a vehicle includes an axle shaft and a continuously variable transmission unit for driving the axle shaft and propelling the vehicle through an infinitely variable speed ratio range, and a fixed displacement pump selectively connected to the continuously variable transmission unit by a coupling means so that the pump can also be operated through the infinitely variable speed ratio range in an economical manner.

BRIEF DESCRIPTION OF THE DRAWINGS

FIG. 2 is a block diagrammatic, plan view of a second embodiment vehicular axle shaft and pump drive mechanism using a pair of continuously variable transmission units, showing a portion of the coupling means in enlarged section, and being constructed in accordance with the present invention.

BEST MODE FOR CARRYING OUT THE INVENTION

Figure 1:
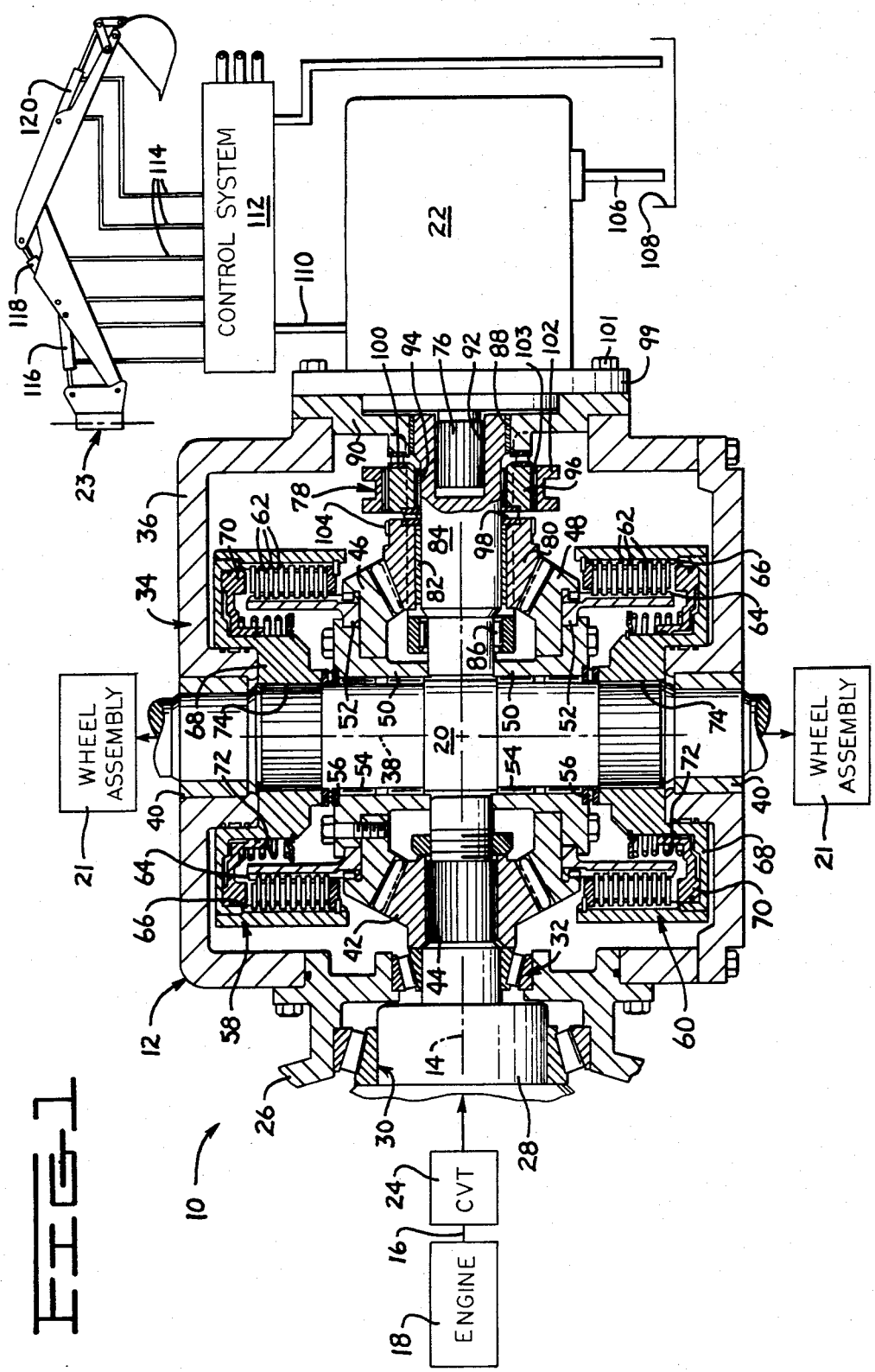
FIG. 1 is a diagrammatic, horizontal sectionalized view of a first embodiment vehicular axle shaft and pump drive mechanism using a single continuously variable transmission unit and being constructed in accordance with the present invention.

Referring initially to FIG. 1, a portion of an industrial backhoe loader vehicle 10 is illustrated including an axle shaft and pump drive mechanism 12 disposed along a longitudinal central axis 14. An input member 16 of the mechanism 12 receives power from an engine 18 and, in a first mode of operation, is effective to drive an output member or axle shaft 20 and opposite pair of wheel assemblies 21 at any speed within an infinitely variable speed ratio range. Alternately, in a second mode of operation, the mechanism 12 drives a fixed displacement implement pump 22 at any speed within such infinitely variable speed ratio range for powerably operating an implement 23 mounted on the vehicle.

More particularly, the axle shaft and pump drive mechanism 12 includes a continuously variable transmission unit 24, hereinafter referred to as a CVT unit, for infinitely changing the speed ratio between the input member 16 and the output member or axle shaft 20. The CVT unit 24 can be of any conventional construction, although I prefer a friction drive transmission unit such as an inclined, nutating double coned transmission device having rolling contact surfaces of revolution disposed about the central axis 14 and being of the general type disclosed in U.S. Pat. No. 4,152,946 issued to Yves Kemper on May 8, 1979 and U.S. Pat. No. 4,233,859 issued to Yves Kemper on Nov. 18, 1980, the full details of which are incorporated herein by reference. That friction drive transmission unit has a relatively simple and economical construction and is generally very effective in its operation. The CVT unit 24 has a stationary housing element 26 and an output shaft 28 rotatably supported in the housing element as by first and second bearing assemblies 30,32.

The axle shaft and pump drive mechanism 12 of FIG. 1 includes a directional change unit 34 at the output end of the CVT unit 24. The directional change unit includes an axle housing 36 of a construction sufficient for rotatably supporting, and being supported by, the axle shaft 20 on a transverse axis 38 through a pair of sleeve bearings 40. A pinion gear 42 is releasably connected to the output shaft 28 of the CVT unit by splines 44, and first and second inwardly facing bevel gears 46,48 are in intermeshing engagement with the pinion gear such that they are capable of being driven in opposite directions relative to the axle shaft 20. First and second flanged members 50,52 are releasably connected to each of the bevel gears and rotate respectively therewith. A sleeve or needle bearing assembly 54 and a thrust bearing assembly 56 are in load bearing contact with the radially inwardly disposed first flanged members 50 so that it can be appreciated that the individual bevel gears are freely rotatably supported on the axle shaft.

In order to make a directional change, the directional unit 34 includes forward clutch means 58 and reverse clutch means 60 for respectively connecting either the first bevel gear 46 or the second bevel gear 48 for joint rotation with the axle shaft 20. Each of the clutch means is of conventional construction such as those having a plurality of interleaved annular plates 62 alternately connected to an inner spline 64 of the second flanged member 52 and to an outer spline 66 formed on a hub 68. A hydraulically engaged annular piston 70 is mounted within each hub for movement along the transverse axis 38 and is disengaged by a plurality of compression springs 72. The hubs 68 are connected for joint rotation with the axle shaft by splines 74.

Advantageously, the fixed displacement implement pump 22 is releasably mounted on the axle housing 36 such that an input drive shaft 76 thereof is disposed on the central axis 14. Coupling means 78, including the pinion gear 42 and bevel gears 46,48 are provided for selectively connecting the pump drive shaft 76 to the output shaft 28 of the CVT unit 24, or disconnecting it therefrom. The coupling means includes a second driving pinion gear 80 and sleeve bearing 82 freely rotatably mounted on an auxiliary drive shaft 84. The auxiliary drive shaft is also rotatably supported on the axis 14 by inner and outer bearing assemblies 86,88 on a flanged supporting arm 90. Inner and outer splines 92,94 releasably connect the auxiliary drive shaft to the pump input drive shaft 76 and to an annular driven member 96 so that these three elements jointly rotate together. First and second thrust bearing assemblies 98,100 are utilized between the second pinion gear 80 and the flanged supporting arm 90 to properly position the driven member 96.

The pump 22 has a mounting flange 99, and a plurality of fasteners 101 extend through the mounting flange and supporting arm 90 into screwthreaded engagement with the axle housing 36 for convenient external mounting of the pump. Note that the pump and its input drive shaft 76 can be easily withdrawn from the auxiliary drive shaft 84 and the supporting arm 90 for servicing by release of the fasteners.

The coupling means 78 further includes a shiftable element or annular shift collar 102 for selectively connecting the second pinion gear 80 to the driven member 96 and, hence, to the implement pump 22 for driving it. In the position illustrated in FIG. 1 the internally splined shift collar 102 is disposed in its disengaged position axially on a plurality of splines 103 on the driven member. Whereas moving it axially and slidably along the splines to the left when viewing the drawing will directly connect the shift collar to a plurality of external coupling teeth 104 formed on the second pinion gear and allow the implement pump to be driven.

Powering of the implement pump 22 in the instant example will cause hydraulic fluid to be drawn through an inlet line 106 from a reservoir 108 into the pump, and to be directed through a pressurized outlet line 110 to a manually operated control system 112 of conventional construction. As is diagrammatically illustrated in FIG. 1, the control system functions to direct pressurized hydraulic fluid through a plurality of conduits 114 to the appropriate ends of first, second and third reciprocable hydraulic motors or hydraulic jacks 116,118,120 for the manipulation of the implement 23, which in this instance is a conventional backhoe mounted on the rear portion of the vehicle 10.

SECOND EMBODIMENT

Referring now to FIG. 2, a second embodiment of the present invention is illustrated on another vehicle 10', it being understood that elements functionally equivalent to those of the first embodiment have been designated with similar reference numerals only with a prime indicator appended thereto.

In the example of FIG. 2 an engine driven directional unit 34' powerably rotates a pinion gear 122, and this drives a bevel gear 124 connected to a transversely oriented input shaft 126. This input shaft drives first and second CVT units 24' and 24" individually associated with the right and left wheel assemblies 21' and 21" respectively, and thus it differs from the first embodiment having a single CVT unit 24.

The output of the right CVT unit 24' is connected to drive a shaft 128, and a driving input member 130 splined thereto is part of a coupling means 78' for selectively connecting the shaft 128 drivingly to either the right wheel assembly 21' via a right axle shaft 20' or to the fixed displacement implement pump 22'. To this end the coupling means 78' includes a shift collar 102' which is mounted to rotate with the input member 130 and which is axially moveable on internal splines 103' formed thereon. Moving the shift collar to the left when viewing FIG. 2 couples the input member 130 to the external coupling teeth 104' of an intermediate pump drive gear 132 which is otherwise free to rotate on a sleeve bearing 133 splined to the shaft 128. The intermediate pump drive gear 132 is intermeshed with a pump drive gear 134 rotatably mounted on another axis 136 radially offset from the main transverse axis 38' but parallel thereto. The pump 22', like the pump 22 of FIG. 1, projects exteriorly from the axle housing 36' and is releasably mounted thereon.

Moving the shift collar 102' to the right couples the input member 130 to a plurality of external coupling teeth 138 formed on a flanged drive member 140 releasably connected to rotate with the right wheel drive axle shaft 20' and which is otherwise freely rotatably mounted on another sleeve bearing 141 splined to the shaft 128. When the shift collar is centered, as illustrated in FIG. 2, the gear 132 and the drive member 140 are free to rotate on the shaft 128 and there is no drive thereto.

Another clutch or disconnect coupling 142 is operatively disposed between the left CVT unit 24", and left drive axle shaft 20" and left wheel assembly 21" for the purpose of disconnecting the left wheel assembly 21" when the right wheel assembly 21' is disengaged by the coupling means 78'.

INDUSTRIAL APPLICIABILITY

In the first mode of operation of the axle shaft and pump drive mechanism 12 shown in FIG. 1, the vehicle 10 is propelled through an infinitely variable speed ratio range by controlling the speed output of the CVT unit 24 in a conventional manner, and by controlling the speed output of the engine 18 driving the CVT unit. For example, the speed of the CVT unit output shaft 28 can be varied from about zero rpm to 2000 rpm. The bevel gears 46,48 rotate at a slight speed reduction therefrom because of the ratio of the number of teeth thereof relative to the number of teeth on the pinion gear 42. Likewise, the flanged members 50,52 rotate at a speed similar to the bevel gears, so that the selective engagement of either the forward clutch means 58 or reverse clutch means 60 will cause the axle shaft 20 to rotate at that speed. Since the axle shaft is connected directly to each of the wheel assemblies 21 the vehicle will be moved forwardly and rearwardly at a speed rate proportioned thereto. Simultaneously, although the second pinion gear 80 is caused to rotate at the same speed as first pinion gear 42 about the central axis 14 it is not connected to the driven member 96 because the shift collar 102 is centered on the driven member as is illustrated. Hence, it rotates freely on the sleeve bearing 82 and does not powerably rotate the auxiliary drive shaft 84 leading to the pump 22.

In a second mode of operation of the mechanism 12 shown in FIG. 1, both of the clutch means 58,60 are disengaged so that the axle shaft 20 is not powerably rotated by the CVT unit 24. Typically, the vehicle 10 is a backhoe loader which has arrived at a job site and has had its stabilizing outrigger arms, not shown, lowered so that its wheels are either off of the ground or only lightly contacting the ground. However, the CVT unit 24 can still powerably rotate the input pinion gear 42, the bevel gears 46, 48, and the second pinion gear 80 at the same speed rates as in the first mode of operation. In order to operate the pump 22 and the backhoe 23 it is necessary to shift the collar 102 and move it leftwardly from the position illustrated in FIG. 1. This is preferably done at a very low speed of the output shaft 28. This allows the second pinion gear, the driven member 96, and the serially disposed pump drive shafts 84,76 to rotate at the same speed as the first pinion gear 42. Subsequent operation of the pump will direct pressurized fluid to the control system 112 via the line 110, whereupon manual movement of the control spools thereof will direct fluid to the motors 116, 118 and 120 as desired to manipulate the backhoe in the usual way.

In either the first or second mode of operation the infinite drive ratio variation within the full range of the CVT unit 24 can be effectively utilized. Substantially the same conditions prevail in the embodiment of FIG. 2. In the first mode of operation both of the CVT units 24' and 24" must be operated to provide the same speed output to the axle shafts 20',20" in order for the vehicle to travel in a straight longitudinal direction. Steering corrections or turns can be conveniently made by turning the front wheels, not shown, or alternatively individually controlling the CVT units to provide unequal output speeds. After the vehicle is stopped the shifting collar or clutch collar 102' can be moved from its rightward position connecting the right CVT unit 24' to the right axle shaft 20', to the leftward position connecting the right CVT unit 24' to the intermediate pump drive gear 132. The left axle shaft 20" is simultaneously disconnected from the left CVT unit 24" by disengagement of the conventional clutch 142. Under these conditions the pump 22' is driven at about the same speed as the output of the right CVT unit in order to power the implement 23' through its full range of operation with the vehicle being stationary.

Note that the pumps 22 and 22' are both mounted on the axle housings 36,36' in locations readily accessible for servicing.

Other aspects, objects and advantages will become apparent from a study of the specification, drawings and appended claims.

I claim:

1. An axle shaft and pump drive mechanism for a vehicle having an implement mounted thereon, comprising:
   a continuously variable transmission unit;
   an axle housing;
   an axle shaft disposed within the axle housing;
   a pump of the fixed displacement type adaptable to drive the implement and being mounted on the axle housing; and
   coupling means for selectively connecting the continuously variable transmisstion unit drivingly to the axle shaft and propelling the vehicle through an infinitely variable speed ratio range, or alternatively drivingly to the pump and operating the pump through an infinitely variable speed ratio range while disconnecting the axle shaft therefrom, the coupling means being disposed within the axle housing.

2. The axle shaft and pump drive mechanism of claim 1 wherein the vehicle has a longitudinal axis and the coupling means includes a rotatable driving member driven by the continuously variable transmisstion unit, and a shift collar disposed on the longitudinal axis for selectively connecting the driving member drivingly to the pump.

3. The axle shaft and pump drive mechanism of claim 1 including a second axle shaft, a second continuously variable transmission unit, and clutch means for selectively disconnecting the second axle shaft from the second continuously variable transmission unit during operation of the pump by the first continuously variable transmission unit.

* * * * *